(12) United States Patent
Zimmermann et al.

(10) Patent No.: US 8,527,176 B2
(45) Date of Patent: Sep. 3, 2013

(54) METHOD FOR MEASURING PRESSURE IN A PRESSURE REGULATION UNIT OF A MOTOR VEHICLE BRAKING SYSTEM, AND A MOTOR VEHICLE BRAKING SYSTEM IN WHICH THE METHOD IS IMPLEMENTED

(75) Inventors: Jochen Zimmermann, Oberwallmenach (DE); Michael Stein, Idstein (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 0 days.

(21) Appl. No.: 13/819,151

(22) PCT Filed: Aug. 1, 2011

(86) PCT No.: PCT/EP2011/063216
§ 371 (c)(1),
(2), (4) Date: Feb. 26, 2013

(87) PCT Pub. No.: WO2012/025336
PCT Pub. Date: Mar. 1, 2012

(65) Prior Publication Data
US 2013/0158783 A1 Jun. 20, 2013

(30) Foreign Application Priority Data

Aug. 26, 2010 (DE) .................. 10 2010 039 818

(51) Int. Cl.
*G06F 7/70* (2006.01)
(52) U.S. Cl.
USPC ............. 701/70; 701/71; 701/78; 701/83; 701/48; 73/121; 73/132; 188/137; 188/141; 188/170; 303/121; 303/167; 303/3; 303/9.71; 303/11; 340/426.32
(58) Field of Classification Search
USPC ................... 701/70, 71, 78, 73, 48
See application file for complete search history.

(56) References Cited

U.S. PATENT DOCUMENTS 4,719,446 A * 1/1988 Hart ........................ 340/12.32
5,919,243 A * 7/1999 Huh ............................ 701/50
(Continued)

FOREIGN PATENT DOCUMENTS

DE 103 59 224 A1 4/2005
DE 10 2005 041 556 A1 3/2007
(Continued)

OTHER PUBLICATIONS

PCT International Search Report—Oct. 27, 2011.
(Continued)

*Primary Examiner* — Redhwan K Mawari
(74) *Attorney, Agent, or Firm* — Brinks Hofer Gilson & Lione

(57) ABSTRACT

A method and system for measuring pressure in a pressure regulation unit of a motor vehicle braking system, without using pressure sensors and having a motor pump unit with an electric motor and a hydraulic pump. The steps include producing a relative motor characteristic diagram for a series of the units. The diagram includes the data of motor-rotational-speed-dependent parameters, intensity of the motor actuation, and parameters relating to the level of the motor load. Further steps include; determining individual motor characteristic variables, determining a current rotational-speed-dependent parameter of an individual motor during the operation of the pump, and calculating a pressure which is characteristic of the braking system, by means of the diagram parameter of the individual motor and the value of the current motor actuation which determines the intensity of the motor actuation, wherein the individual motor characteristic variables are taken into account.

13 Claims, 3 Drawing Sheets

(56) References Cited

U.S. PATENT DOCUMENTS

| | | | |
|---|---|---|---|
| 5,991,681 A * | 11/1999 | Bill et al. | 701/70 |
| 6,256,570 B1 * | 7/2001 | Weiberle et al. | 701/70 |
| 7,418,333 B2 * | 8/2008 | Bouchard et al. | 701/70 |
| 8,096,445 B2 * | 1/2012 | Yang et al. | 222/52 |
| 2008/0185399 A1 * | 8/2008 | Yang et al. | 222/52 |

FOREIGN PATENT DOCUMENTS

| | | |
|---|---|---|
| DE | 10 2007 050 662 A1 | 4/2009 |
| DE | 10 2010 028 083 A1 | 11/2010 |
| WO | WO 2005/007475 A1 | 1/2005 |
| WO | WO 2007/057415 A1 | 5/2007 |
| WO | WO 2009/053389 A1 | 4/2009 |
| WO | WO 2009/127472 A1 | 10/2009 |
| WO | WO 2010/122132 A1 | 10/2010 |

OTHER PUBLICATIONS

German Examination Report—Dec. 14, 2010.

* cited by examiner

METHOD FOR MEASURING PRESSURE IN A PRESSURE REGULATION UNIT OF A MOTOR VEHICLE BRAKING SYSTEM, AND A MOTOR VEHICLE BRAKING SYSTEM IN WHICH THE METHOD IS IMPLEMENTED

CROSS-REFERENCE TO RELATED APPLICATIONS

This application claims priority to German Patent Application No. 10 2010 039 818.7, file Aug. 26, 2010 and PCT/EP2011/063216, filed Aug. 1, 2011.

FIELD OF THE INVENTION

The invention relates to a method for measuring pressure, without pressure sensors, in a pressure regulation unit of a motor vehicle braking system by means of a motor pump unit composed of an electric motor and a hydraulic pump, and to a pressure regulation unit in a motor vehicle braking system having an electronic regulator and a pump motor which is actuated by means of a PWM stage and is connected to a hydraulic pump, wherein means for sampling the motor voltage are present.

BACKGROUND OF THE INVENTION

DE 10 2005 041 556 A1 discloses a method for determining an admission pressure prevailing between a master brake cylinder and an inlet valve of a wheel brake cylinder of a motor vehicle braking system. According to the described method, the admission pressure (generally the pressure at the outlet of the master brake cylinder) is determined taking into account the profile of a run-on voltage of an electric motor which is connected to a pump and which is actuated in a clocked fashion by means of a PWM (pulse width modulation) stage. For this purpose, a plurality of characteristic variables of the voltage profile are measured and are each used to determine an admission pressure value, wherein an evaluation of the quality and/or reliability of the measured characteristic variables, filtering and/or conditioning of the characteristic variables and/or of the admission pressure values determined therefrom in the event of deficient quality and/or reliability of the measured characteristic variables, and averaging of the admission pressure values determined from the various characteristic variables occurs, wherein only pressure values of a similar magnitude are taken into account, and averaging of the admission pressure values over time is carried out in order to damp fluctuations. For the later determination of the admission pressure during operation of the pump, a characteristic curve is stored in a data memory (for example read-only memory) of a motor vehicle braking system. The valves which are correspondingly used in the braking system for pressure control are then actuated taking into account the admission pressure calculated on the basis of the characteristic curve.

However, the implementation of the method described above is made more difficult by virtue of the fact that the characteristic curve is different for each individual pump and each individual braking system owing to fabrication tolerances. As the operating period of the pump increases, aging phenomena and wear phenomena, for example on the rotary bearing of the pump rotor, also occur and influence the operation characteristic of the brake system.

With respect to the determination of the admission pressure in a motor vehicle braking system it is therefore known to determine the rotational speed of the motor or of the pump from the generator voltage of an electric direct current motor which is connected to a hydraulic pump. The generator voltage can be provided, for example, by tapping the voltage at the motor terminals in the center of the inter-pulse period, wherein the voltage is sampled once per period with an A/D converter. It has become apparent that a motor rotational speed which is determined by means of a generator voltage which is obtained in this way is still too imprecise for determining the admission pressure in modern motor vehicle braking systems.

The object of the present invention is to make available a particularly precise method for estimating the set pressure without using a pressure sensor, wherein the method is advantageous, in particular, when the rotational speed of the pump motors used fluctuates individually or there is individual fabrication variation of the pump which leads to deviations of the delivery quantity.

This object is achieved according to the invention by means of the method as described herein.

INTRODUCTORY DESCRIPTION OF THE INVENTION

According to the inventive method, pressure measurement takes place, without a pressure sensor, in a pressure regulation unit of a motor vehicle braking system by means of a motor pump unit composed of an electric motor and a hydraulic pump, wherein the motor is actuated by means of electrical pulse width modulation (PWM) (for example during the operation of an Antilock Braking System-ABS controller).

First, according to the method, a relative motor characteristic diagram for the series is produced before the manufacture of an individual pressure regulation unit or of a motor pump unit or of a motor. The characteristic diagram comprises at least the data of:

motor-rotational-speed-dependent parameters,
intensity of the motor actuation (for example duty cycle), and
parameters relating to the level of the motor load
(for example motor torque or counterpressure).

Individual motor characteristic variables (for example maximum rotational speed or rotational speed in the event of certain pressure or magnetic motor characteristic variables etc.) are then determined after or during the fabrication of the hydraulic unit or of the motor.

A current rotational-speed-dependent parameter of the motor (for example the current rotational speed from the generator voltage) is then determined during the operation of the pump.

Finally, a pressure which is characteristic of the braking system (e.g. the master cylinder pressure of the braking system) is calculated by means of the motor characteristic diagram by means of the motor-rotational-speed-dependent parameter and the current value which determines the intensity of the motor actuation (for example of the duty cycle DC of the PWM control process performed during the motor actuation), wherein the individual motor characteristic variables are taken into account in the calculation.

Data which specify the rotational-speed-dependent parameter relative to an absolute rotational-speed-dependent parameter (for example rotational speed in the case of full modulation without a load) are preferably stored in the relative motor characteristic diagram. This makes it possible to calculate later an individual characteristic diagram with absolute rotational speed values by including individually measured parameters.

The relative motor characteristic diagram for the series is preferably transmitted on every individual occasion when a braking system is manufactured, into a memory of the pressure regulation unit which is composed, in particular, of an electronic regulator and a hydraulic unit. Alternatively it is preferred to take a corresponding measure with which the motor characteristic diagram is transmitted into the pressure regulation unit.

The individual motor characteristic variables preferably comprise:
- at least one characteristic variable which specifies the motor rotational speed in the case of a predefined first intensity of the motor actuation with a first predefined motor load (for example without application of pressure to the pump in the idling or load free motor),
- at least one further characteristic variable which specifies the rotational speed in the case of a certain second motor load (for example a torque which corresponds to a predefined hydraulic counterpressure) with a predefined intensity of the motor actuation, and
- in particular a further characteristic variable (for example a magnetic parameter of the motor) which specifies the dependence of the rotational speed on the generator voltage $G_K$.

The current motor-rotational-speed-dependent parameter is preferably determined from the generator voltage $G_K$, or is the actual generator voltage.

The absolute rotational-speed-dependent parameter is preferably the rotational speed given in the case of maximum modulation (for example in the case of DC=100%) of the individually fabricated motor.

By means of the individual motor characteristic variables (N_MAX, N_200), the relative rotational-speed-dependent parameter/parameters (n/n_max) is/are preferably converted into absolute rotational-speed-dependent parameters (n_max). In the motor characteristic diagram, reference points with existing measured values for the relative rotational-speed-dependent parameter at certain pressure values are preferably present.

The relative motor characteristic diagram is then preferably converted into an absolute motor characteristic diagram with the absolute rotational-speed-dependent parameters (in particular rotational speed values in the case of maximum modulation) determined according to the method in the previous paragraph.

In the motor characteristic diagram, reference points with existing measured values are therefore present for the absolute rotational-speed-dependent parameter at certain pressure values. Further values of the absolute rotational-speed-dependent parameter are expediently calculated by interpolation or extrapolation, at pressures for which there are no reference points.

The motor-rotational-speed-dependent parameter and/or the generator voltage $G_K$ is preferably determined by single, in particular multiple, sampling of the generator voltage of the motor in an inter-pulse period of a PWM period of the PWM motor actuation process.

Multiple sampling preferably occurs in the inter-pulse period. The sampled values which are determined by multiple sampling are selected by means of a time window, wherein the time window is defined as a function of the pump rotational speed.

The pump rotational speed is preferably determined from the generator voltage $G_K$ and the individual motor characteristic variable.

The invention also relates to a pressure regulation unit in a motor vehicle braking system comprising an electronic regulator and a pump motor which is actuated by means of a PWM stage and is connected to a hydraulic pump, wherein means for sampling the motor voltage are present. In this context, the electronic regulator, to be more precise the electronic computing unit contained therein, implements the pressure measuring method described above.

Further preferred embodiments can be found from the dependent claims and the following description of an exemplary embodiment with reference to figures.

DETAILED DESCRIPTION OF THE INVENTION

Figure 1:
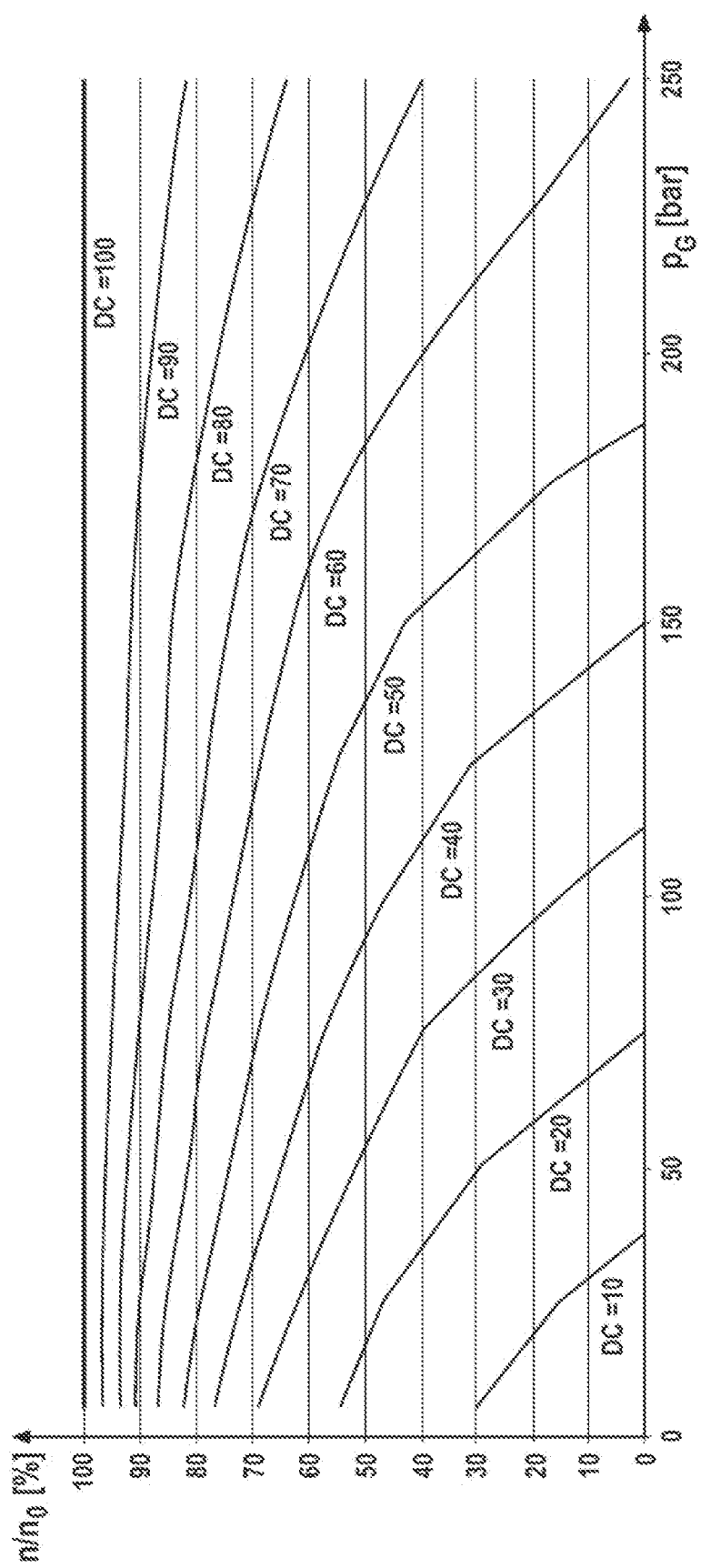
FIG. 1 shows a diagram representing a relative motor characteristic diagram.

FIG. 1 shows the relative characteristic diagram of a permanently excited direct current motor with PWM actuation. The rotational speed of the motor is set by means of the duty cycle (DC, 0 to 100%) of the PWM actuation process. The relative rotational speed $n/n_0$ of the motor is plotted on the ordinate as a percentage which arises from the ratio of the rotational speed n in the case of the respective actuation of the PWM to the rotational speed $n_o$ in the case of full modulation (in the case of the respectively present counter pressure).

The counterpressure $P_G$, which reflects the load torque of the motor, is represented on the abscissa.

The characteristic diagram arises from a group of reference points for various duty cycles and various counterpressures or load torques at the motor or at the pump.

The relative characteristic diagram illustrated in FIG. 1 is produced once by measurement on a pressure regulation unit which is representative of the later series fabrication, and is then stored during the series production in the form of reference points in a memory of the series-fabricated pressure regulation unit. The measured values of the representative pressure regulation unit are formed particularly expediently over a statistical measuring series composed of a plurality of individual items fabricated before the series.

Below there is a description, with respect to FIG. 2, of how the absolute characteristic diagram can be determined from the relative characteristic diagram.

During or after the production of an individual pressure regulation unit or of a pump unit or of a motor, the individual motor characteristic variables described below are determined each time. These individual motor characteristic variables are stored permanently in a memory of the electronic regulator which is connected to the hydraulic unit of the pressure regulation unit.

The value of the maximum rotational speed N_MAX in the case of full actuation of the motor without an opposing load (corresponds to a differential pressure on the pump of 0 bar) is firstly determined as an individual motor characteristic variable. The value can also be determined in the case of a pressure regulation unit which is still filled with hydraulic fluid. For this purpose, the PWM current controller connected to the motor is actuated with a duty cycle of DC=100%.

The characteristic variable N_200 is then determined as a further individual motor characteristic variable. This specifies the rotational speed of the motor in the case of a defined, comparatively high opposing load, for example in the case of 200 bar counter pressure on the pump output side.

Finally, the characteristic variable U2N is determined. This denotes the magnet constant of the motor corresponding to the relationship which is valid in the case of the permanently excited direct current motor:

$$\text{Rotational speed} = \frac{\text{Generator voltage}}{U2N}$$

The absolute characteristic diagram is produced from the relative characteristic diagram by means of the individual motor characteristic variables above, which are determined after fabrication. For this purpose, the relative rotational speed is converted to an absolute rotational speed for each operating point (load torque/pressure). The new values can then be calculated or stored temporarily as reference points of the absolute characteristic diagram. In this context, it is expedient to calculate the absolute characteristic diagram only temporarily in the range of the current working point, as a result of which the required memory space can be greatly reduced. The rotational speed in the case of full actuation plotted against the load behaves virtually linearly as in the case of the externally excited direct current motor. For this reason, it is sufficiently precisely described with the two calibration points N_MAX and N_200. As a result, a characteristic curve "rotational speed as a function of the counter pressure" corresponding to 100% DC is obtained with the equation:

$$n = \frac{p - P_0}{P_{200} - P_0} \cdot (N_{200} - N_0) + N_0$$

Figure 2:
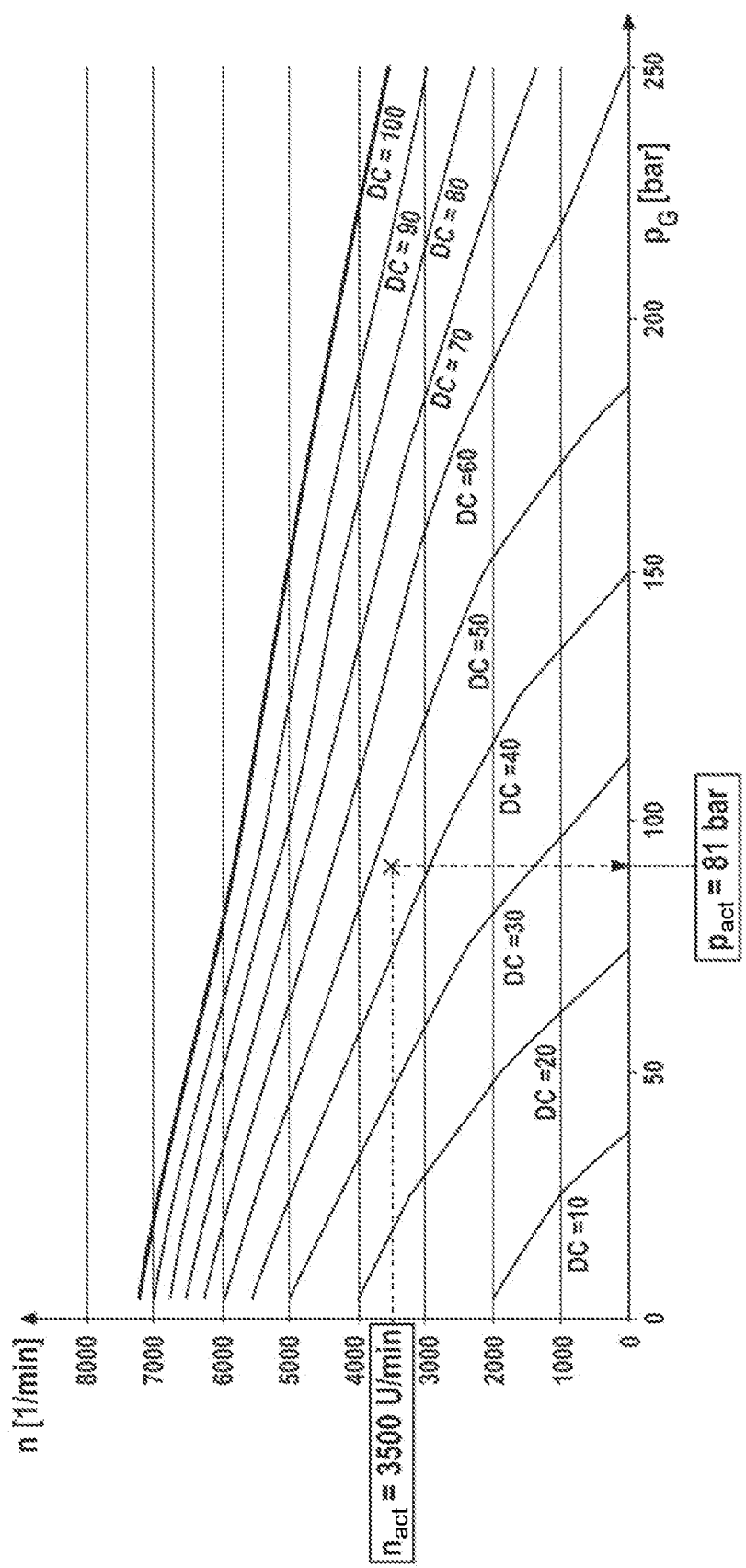
FIG. 2 shows an absolute motor characteristic diagram calculated from the relative motor characteristic diagram, with an example of pressure estimation according to the invention during the operation of the (individual) motor vehicle brake.

If the collection of data from the relative characteristic diagram is multiplied by the individually calibrated motor characteristic curve above, the absolute characteristic diagram illustrated in FIG. 2 is obtained.

In the text which follows, an example of a pressure estimation using the absolute characteristic diagram is described. The pressure (load torque) which opposes the pump motor corresponds precisely to the characteristic pressure to be estimated (the characteristic pressure of the braking system is, for example, the pressure at the output of the tandem master brake cylinder). The current generator voltage, which is obtained from the motor rotational speed, is determined by multiple sampling of motor terminal voltage in the inter-pulse period, as will be described in more detail below with reference to FIG. 3.

The current rotational speed can then be determined by taking into account the magnet constant U2N of the motor, determined from earlier calibration measurements, and by taking into account the previously determined generator voltage and the equation $$\text{Rotational speed} = \frac{\text{Generator voltage}}{U2N}$$

In the example illustrated in FIG. 2 the current rotational speed which is determined in this way is 3500 rpm.

With the absolute characteristic diagram described further above for the motor which has been determined using the individual motor characteristic variables determined after fabrication and the determined rotational speed, the pressure in the brake circuit upstream of the pump outlet (corresponds essentially to the master cylinder pressure) can then be determined. For this purpose, the current value of the duty cycle, which is 45% in the illustrated example, is used. Since no curve DC=45% is stored in the group of curves of the absolute characteristic diagram, an interpolation is performed on the ordinate, with the result that the corresponding pressure value (in the illustrated example $P_{act}$=81 bar) is obtained on the abscissa.

Figure 3:
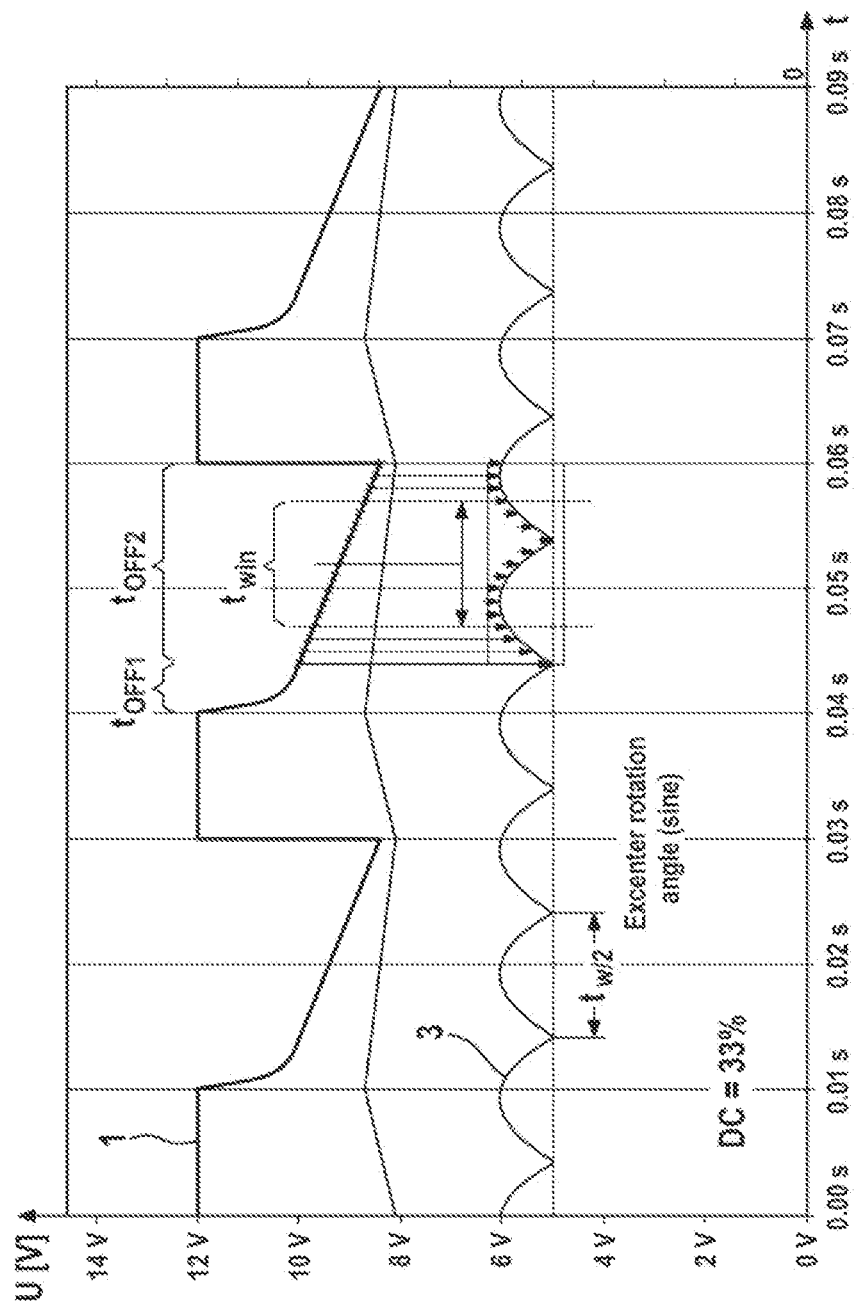
FIG. 3 shows a diagram with the time profile of the motor terminal voltage and of the angle of the pump position with a time window for selecting sampled values.

In FIG. 3, curve 1 represents the time profile of the terminal voltage of the pump motor. The pump motor is actuated by means of a PWM driver stage. The signal of the curve 1 is then present at the motor terminals. The PWM period $T_{PWM}$ of a PWM cycle is divided up into an on phase and an off phase ($t_{ON}$ and $t_{OFF}$). The ratio of the length of the on phase to the off phase is obtained from the level of modulation (duty cycle, values between 0 and 1) of the PWM stage. During the time $t_{ON}$, the motor is connected to the operating voltage. The rotational speed of the pump motor can be determined during the off phase by means of the generator voltage. In the externally excited direct current motor which is used, the generator voltage behaves in a virtually linear fashion with the rotational speed. For the measurement of the voltage values, the motor terminals are connected to an A/D converter which performs sampling, initiated by a trigger pulse, at a certain time in the inter-pulse period. As is illustrated with reference to the arrows, only sampled values of the generator voltage within a predefined time window in the switch-off phase of the PWM actuation signal are taken into account for calculating the rotational speed. From the data acquired in this way, which occur after the decay of the motor current, it is possible, for example, to form a mean value for the generator voltage. It is also possible to calculate an equalization line from the data (for example by linear regression), as a result of which relatively high measuring accuracy of the rotational speed which is determined by this means is usually obtained.

In the exemplary hydraulic device of a motor vehicle brake, the motor described above is connected via its shaft to a pump which has a rotational-angle-dependent torque profile which has a single, double or multiple periodic profile depending, in particular, on the design of the pump. In the case of an eccentric two-circuit radial piston pump, in schematically simplified terms a torque profile is obtained which corresponds to curve 3 with a double period, i.e. the frequency of the torque profile is twice as large as the rotational frequency of the motor. By means of a particularly preferred suitable selection of the time window, the influence of the torque on the determination of the rotational speed can advantageously be significantly reduced. In this context, use is made of the fact that the size of the window can be defined, by means of an initially coarse measurement of the rotational speed, with such precision that an integral multiple of a load half-wave is always located in the selected measuring window.

As already described, with the rotational speed determined very precisely according to the above method, the system pressure of a motor vehicle braking system can be determined with particularly high accuracy. It is alternatively also possible to determine the pressure in which the load torque at the pump is determined. According to a further preferred embodiment, by using the acquired parameters it is particularly advantageously possible to improve an analog valve of actuation means by virtue of the more precise knowledge of the master cylinder pressure.

While the above description constitutes the preferred embodiment of the present invention, it will be appreciated that the invention is susceptible to modification, variation and change without departing from the proper scope and fair meaning of the accompanying claims.

The invention claimed is:

1. A method for measuring pressure, without requiring use of pressure sensors, in a pressure regulation unit of a motor vehicle braking system having a motor pump unit composed of an electric motor and a hydraulic pump, wherein the motor is actuated by means of electrical pulse width modulation, comprising the steps of:
producing a relative motor characteristic diagram for a series of the pressure regulation unit or of the motor pump unit or of the motor before the manufacture of an individual of the pressure regulation unit or of the motor pump unit or of the motor which diagram includes at least the data of motor-rotational-speed-dependent parameters ($n/n_0$), and intensity of the motor actuation (DC), and parameters relating to the level of the motor load (P_G),
determining individual motor characteristic variables (N_MAX, N_200, U2N) after or during the fabrication of the motor pump unit or of the motor,
determining a current rotational-speed-dependent parameter of an individual motor ($N_{act}$) during the operation of the pump, and
calculating a pressure ($P_{THZ}$), which is characteristic of the braking system, by means of the motor characteristic diagram and the motor-rotational-speed-dependent parameter of the individual motor ($n_{act}$) and the value of the current motor actuation (DC) which determines the intensity of the motor actuation, wherein the individual motor characteristic variables are taken into account.

2. The method as claimed in claim 1, further comprising in that data which specify the rotational-speed-dependent parameter ($n/n\_max$) relative to an absolute rotational-speed-dependent parameter ($n\_max$) are stored as part of the relative motor characteristic diagram.

3. The method as claimed in claim 1 further comprising in that on each individual occasion that the pressure regulation unit is manufactured, the relative motor characteristic diagram for the series is transmitted into a memory of the pressure regulation unit, or a corresponding measure, with which the motor characteristic diagram is transmitted into the pressure regulation unit, is taken.

4. The method as claimed in claim 1 further comprising in that the individual motor characteristic variables comprise at least one characteristic variable (N_MAX) which includes the motor rotational speed in the case of a predefined first intensity of the motor actuation with a first predefined motor load, at least one further characteristic variable (N_200) which comprises the rotational speed in the case of a certain second motor load with a predefined intensity of the motor actuation, and a further characteristic variable (U2N) which specifies the dependence of the rotational speed on the generator voltage $G_K$.

5. The method as claimed in claim 1, further comprising in that the current motor-rotational-speed-dependent parameter (n_act) is determined from a generator voltage $G_K$ or is an actual generator voltage $G_K$.

6. The method as claimed in claim 2, further comprising in that the absolute rotational-speed-dependent parameter (n_max) is the rotational speed in the case of maximum modulation of the individual motor.

7. The method as claimed in claim 2 further comprising in that the relative rotational-speed-dependent parameter/parameters parameter ($n/n\_max$) is converted into the absolute rotational-speed-dependent parameters ($n\_max$) by means of the individual motor characteristic variables (N_MAX, N_200).

8. The method as claimed in claim 7, further comprising in that the relative motor characteristic diagram is converted into an absolute motor characteristic diagram with the absolute rotational-speed-dependent parameters.

9. The method as claimed in claim 1 further comprising in that reference points with existing measured values for the absolute rotational-speed-dependent parameter in the case of certain pressure values are present in the motor characteristic diagram, and further values of the absolute rotational-speed-dependent parameter are calculated by interpolation or extrapolation for pressures for which no reference points are present.

10. The method as claimed in claim 4 further comprising in that the motor-rotational-speed-dependent parameter or the generator voltage $G_K$ is determined by at least a single sampling of the generator voltage of the motor in an inter-pulse period of a pulse width modulation period of the pulse width modulation motor actuation process.

11. The method as claimed in claim 10, further comprising in that multiple sampling takes place in the inter-pulse period and the sampled values which are determined by multiple sampling are selected by means of a time window, wherein the time window is defined as a function of the pump rotational speed.

12. The method as claimed in claim 11, further comprising in that the pump rotational speed is determined from the generator voltage $G_K$ and at least one of the individual motor characteristic variables (U2N).

13. A pressure regulation unit in a motor vehicle braking system comprising an electronic regulator and a pump motor which is actuated by means of a PWM stage and is connected to a hydraulic pump, wherein means for sampling the motor voltage are present, comprising in that the electronic regulator carries out a pressure measuring method of producing a relative motor characteristic diagram for a series of the pressure regulation unit or of the motor pump unit or of the motor before the manufacture of an individual of the pressure regulation unit or of the motor pump unit or of the motor which diagram includes at least the data of motor-rotational-speed-dependent parameters ($n/n_0$), and intensity of the motor actuation (DC) and parameters relating to the level of the motor load (PG),
determining individual motor characteristic variables (N_MAX, N_200, U2N) after or during the fabrication of the motor pump unit or of the motor,
determining a current rotational-speed-dependent parameter of an individual motor ($N_{act}$) during the operation of the pump, and
calculating a pressure ($P_{THZ}$), which is characteristic of the braking system, by means of the motor characteristic diagram and the motor-rotational-speed-dependent parameter of the individual motor ($n_{act}$) and the value of the current motor actuation (DC) which determines the intensity of the motor actuation, wherein the individual motor characteristic variables are taken into account.

* * * * *

UNITED STATES PATENT AND TRADEMARK OFFICE
CERTIFICATE OF CORRECTION

PATENT NO. : 8,527,176 B2  
APPLICATION NO. : 13/819151  
DATED : September 3, 2013  
INVENTOR(S) : Jochen Zimmermann and Michael Stein Page 1 of 1

It is certified that error appears in the above-identified patent and that said Letters Patent is hereby corrected as shown below:

In the Claims

Column 8, lines 4 and 5 (claim 7) after "rotational-speed-dependent", delete "parameter/parameters" and in line 7, after "N_", remove bold from --200--.

Signed and Sealed this  
Twenty-ninth Day of October, 2013

Teresa Stanek Rea  
*Deputy Director of the United States Patent and Trademark Office*